(12) United States Patent
Ishimori et al.

(10) Patent No.: US 6,353,473 B1
(45) Date of Patent: Mar. 5, 2002

(54) WAFER THICKNESS MEASURING APPARATUS AND DETECTION METHOD THEREOF

(75) Inventors: Hideo Ishimori, Ashigarakami-gun; Hiroshi Nakajima, Chigasaki, both of (JP)

(73) Assignee: Hitachi Electronics Engineering Co., Ltd., Tokyo (JP)

( * ) Notice: Subject to any disclaimer, the term of this patent is extended or adjusted under 35 U.S.C. 154(b) by 0 days.

(21) Appl. No.: 09/499,513

(22) Filed: Feb. 9, 2000

(30) Foreign Application Priority Data

Feb. 15, 1999 (JP) ............................................. 11-035258

(51) Int. Cl.[7] ........................... G01R 21/00; G01B 9/02
(52) U.S. Cl. ........................ 356/73; 356/485; 356/503
(58) Field of Search ............................ 356/72, 73, 485, 356/489, 503, 511, 630, 631

(56) References Cited

U.S. PATENT DOCUMENTS

| 4,860,229 A | 8/1989 | Abbe et al. | |
| 5,583,639 A | * 12/1996 | Rostvall | ....................... 356/73 |
| 5,905,576 A | * 5/1999 | Takada et al. | ............... 356/623 |

FOREIGN PATENT DOCUMENTS

JP        2001033215 A    *  2/2001

OTHER PUBLICATIONS

"High Accuracy Wafer Flatness Measuring System Employing an Optical Interference System", Hitachi Electronics Engineering Co., Ltd., 1998.

* cited by examiner

*Primary Examiner*—Samuel A. Turner
(74) *Attorney, Agent, or Firm*—Antonelli, Terry, Stout & Kraus, LLP

(57) ABSTRACT

In a wafer thickness measuring apparatus and a method thereof, detection values are obtained from a sample piece (for example, a wafer chip) at a plurality of measurement points thereon by first and second detectors for absolute measurement of distances, and at the same time, measurement values of the fluctuations, for relative measurement of distances, are obtained by the optical heterodyne interferometer, and those measurement values are memorized as a plurality of measurement data being related with those measurement values. When measuring the thickness of a wafer, the measurements are performed at measurement points on the wafer which has a front surface and a reverse surface in height lying within the height of the sample piece, on which such a correspondence is obtained, thereby obtaining the detection values of the first and second detectors. Searching conversely from those detection values by referring the correspondence data, the respective detection values are converted into the data of the relative fluctuations therefrom upon the basis of the thickness of the sample piece, thereby obtaining the relative amounts of fluctuation in positions (i.e., the distances) upon the basis of the thickness of the sample piece, respectively. Then, by conducting addition and/or subtraction of the fluctuation amount on the front surface and the reverse surface from the thickness of the sample piece as a reference, it is possible to calculate out the thickness of the wafer to be measured.

18 Claims, 4 Drawing Sheets

FIG. 4

| CIRCUMFERENCE POSITION OF WAFER CHIP (θ) | θ1 | θ2 | θ3 | θ4 | θ5 | ... | θn |
|---|---|---|---|---|---|---|---|
| MEASUREMENT VALUE OF PSD IN (V) FRONT SURFACE SIDE | 2.0 | 2.1 | 2.2 | 2.3 | 2.4 | ... | 5.0 |
| MEASUREMENT VALUE OF PSD IN (V) REVERSE SURFACE SIDE | 4.8 | 4.7 | 4.6 | 4.5 | 4.3 | ... | 1.8 |
| RELATIVE MEASUREMENT VALUE (μm) | 0 (REFERENCE) | 5 | 10 | 15 | 20 | ... | 150 |

_US 6,353,473 B1_

WAFER THICKNESS MEASURING APPARATUS AND DETECTION METHOD THEREOF

BACKGROUND OF THE INVENTION

1. Field of the Invention

The present invention relates to a wafer thickness measuring apparatus and a method thereof, and in more details, to a wafer thickness measuring apparatus and a method thereof, applying measurement by means of an optical heterodyne interference thereto, for performing the measurement in the distance between relative positions (i.e., a length measurement), being able to perform absolute length measurement exceeding the wave-length of a light thereof, thereby enabling the measurement with an accuracy by means of the optical heterodyne interference.

2. Description of Prior Art

As one of items to be measured when conducting measurement in the flatness of a wafer, a measurement in thickens of the wafer is listed up. In recent years, the thickness of the wafer comes to be thinner gradually, and therefore, at present, there is required a reproducibility of measurement of length being equal or less than ±0.5 µm as the accuracy for it.

The flatness measurement of the wafers, in general, is performed by means of an electrostatic sensor, so as to measure a condition of unevenness or non-uniformity on the surface of the wafer, therefore it is not required to measure such the long distance like the thickness of the wafer.

In a relation that the thickness of the wafer is also included in the items to be performed when conducting the flatness measurement of the wafer, there can be considered that the electrostatic capacity sensor for the measurement on the flatness is also used for the purpose of the measurement on the thickness of the wafer. However, the thickness of the wafer is about equal or greater than 700 µm, exceeding the range of measurement of the flatness measurement by means of the electrostatic capacity sensor, therefore it is impossible to measure it with high accuracy. However, if an other sensor for measurement is provided therewith, there are brought about problems that the apparatus comes to be large-scaled, and that a manufacturing cost thereof rises up.

Also, for the measurement of the thickness by means of the electrostatic capacity sensor or the like, in general, there must be provided a measurement device for measuring a distance from a reference position facing to a front surface side up to the front surface of the wafer and a measurement device for measuring a distance from a reference position facing to a reverse surface side up to the reverse surface of the wafer, and the reference positions facing to the front surface side and the reverse surface side are fixed onto a frame of a measuring apparatus. Then, an error is caused in the reference positions due to expansion and contraction of the frame due to changes of the temperature thereof, or due to secular distortion thereof, therefore it is difficult to keep the measurement of the high accuracy.

SUMMARY OF THE INVENTION

An object according to the present invention, for dissolving such the problems of the convention arts as mentioned in the above, is to provide a wafer thickness measuring apparatus and a method thereof by using a measurement instrument of an optical heterodyne interferometer, thereby being able to measure the thickness of the wafer, exceeding the wave-length of the light thereof, with high accuracy.

According to the present invention, for achieving the above-mentioned object, there is provide a wafer thickness measuring apparatus, comprising:

a sample piece being positioned corresponding to height of a wafer and inclined at a predetermined angle substantially corresponding to an inclination angle due to bend of said wafer, and having a constant thickness being already known and equivalent to that of said wafer;

a first detector for generating a detection signal depending upon a distance from a predetermined reference position facing to a front surface side of said wafer up to a position on the front surface of said wafer corresponding to a measurement point of an optical heterodyne interferometer;

a second detector for generating a detection signal depending upon a distance from a predetermined reference position facing to a reverse surface side of said wafer to a position on the reverse surface of said wafer corresponding to a measurement point of said optical heterodyne interferometer;

a data sampling/memorizing means for measuring fluctuations at a large number of the measurement points on the front surface or the reverse surface of said sample piece by means of said optical heterodyne interferometer, and then for memorizing detection values based upon said detection signals of said first and second detectors, which are obtained at said measurement points, depending upon the fluctuation amounts at the respective measurement points; and means for obtaining the respective detection values upon the detection signals of said first and second detectors at arbitrary measurement points on said wafer, a front surface and a reverse surface of which lie within a range of height between the front surface and the reverse surface of said sample piece, and for obtaining said fluctuation amounts corresponding to said detection values which are measured by said optical heterodyne interferometer and memorized in said data sampling/memorizing means from the respective detection values, respectively, thereby calculating out thickness of said wafer upon basis of the respective fluctuation amounts obtained and the thickness of said sample piece.

Further, according to the present invention, for achieving the object mentioned above, there is provided a wafer thickness measuring apparatus for detecting a thickness of a wafer to be measured, as well as a flatness on a surface thereof, comprising:

an absolute distance detecting means for detecting an absolute distance from a reference position facing a front surface side of said wafer to the front surface of said wafer;

a relative fluctuation detecting means for detecting a relative fluctuation upon the front surface of said wafer;

means for memorizing a plurality of detected values from said absolute distance measuring means and a plurality of detected values from said relative fluctuation detecting means, by making correspondence therebetween; and a data processing means for calculating the thickness of said wafer, upon basis of the detected values from said absolute distance detecting means and said relative fluctuation detecting means, and the memorized values thereof in said memorizing means, wherein said apparatus further comprises a sample piece being positioned and inclined at a predetermined angle corresponding to an inclination angle due to bend caused in a portion of said wafer when being mounted on said apparatus, wherein said data processing means memorizes the detected values from said absolute distance detecting means and said relative fluctuation detecting means at a plurality of measurement points upon the surface of said sample piece by making correspondence therebetween, and when calculating the thickness of said wafer, said data processing means obtains the relative fluctuation value corresponding to the measurement point upon basis of the detected value of said absolute distance detecting means, thereby to calculate the thickness of said wafer upon basis of comparison between the detected value of said relative fluctuation detecting means and the obtained value of the relative fluctuation.

And further, according to the present invention, there is also provided a wafer thickness measuring method for detecting a thickness of a wafer to be measured, comprising the following steps:

detecting a sample piece being positioned and inclined at a predetermined angle corresponding to an inclination angle due to bend caused in a portion of said wafer to be measured when being mounted on said apparatus, in advance, on an absolute distance from a reference position facing a front surface side of said sample piece to the front surface thereof and an fluctuation upon the surface of said sample piece;

memorizing the detected distance value and the relative fluctuation by making correspondence therebetween;

detecting the absolute distance from said reference position facing a front surface side to the front surface of said wafer to be measured, which is mounted on a measuring apparatus, and the relative fluctuation upon the surface of said wafer; and picking up the relative fluctuation memorized in advance, by making correspondence with the detected absolute distance, and compare the relative fluctuation picked up with the relative fluctuation detected, thereby to calculate the thickness of said wafer.

In this manner, the detection values are obtained from the sample piece (for example, a wafer chip) at a plurality of measurement points thereon by the first and second detectors for absolute measurement of distances, and at the same time, the measurement values of the fluctuations, for relative measurement of distances, are obtained by the optical heterodyne interferometer, and then those measurement values are memorized as a plurality of measurement data being related with those measurement values.

With this, it is possible to corresponds the fluctuation amounts on the front surface side and on the reverse surface side upon the basis the thickness of the sample piece to the detection values of said first and second detectors for the absolute measurement of distances.

When measuring the thickness of the wafer, the measurements are performed at the measurement points on the wafer which has the front surface and the reverse surface in height, lying within the height of the sample piece, on which such the correspondence is obtained, thereby obtaining the detection values of the first and second detectors. Searching conversely from those detection values by referring the correspondence data, it is possible to convert the respective detection values into the data of the relative fluctuations therefrom, upon the basis of the thickness of the sample piece. Since the thickness of the sample piece is constant, the fluctuations on both the front surface and the reverse surface must be substantially constant when being measured anyplace on the sample piece, however when a difference is generated in the fluctuation amount between on the front surface and on the reverse surface at the measurement point on the wafer, upon the conversion data thereof, that appears as an amount of difference with respect to the thickness of the sample piece.

In other words, the data being converted into the relative fluctuation amounts indicate the relative amounts of shifting in positions (i.e., the distances) upon the basis of the thickness of the sample piece, respectively. Then, by conducting addition and/or subtraction of the shifting amount on the front surface and the reverse surface from the thickness of the sample piece as a reference, it is possible to obtain the thickness of the wafer to be measured.

The value being actually calculated in this case is a sum of the relative measurement value and the known thickness of the sample piece, therefore the absolute values obtained as the detection values of the first and second detectors only function as a medium for obtaining the relative measurement values. As a result of this, at the time point when measuring the wafer thickness, the corresponding data are produced by the data sampling/memorizing means, therefore the accurate wafer thickness can be obtained by the relative measurement at every moment, without receiving ill influence of the temperature, and without a necessity of provision of an apparatus for the absolute measurement with high accuracy.

BRIEF DESCRIPTION OF THE DRAWINGS

FIG. 4 is an explanatory view of a absolute/relative distance conversion table for use in the above.

DETAILED DESCRIPTION OF PREFERRED EMBODIMENT(S)

Hereinafter, embodiments according to the present invention will be fully explained by referring to the attached drawings.

Figure 1:
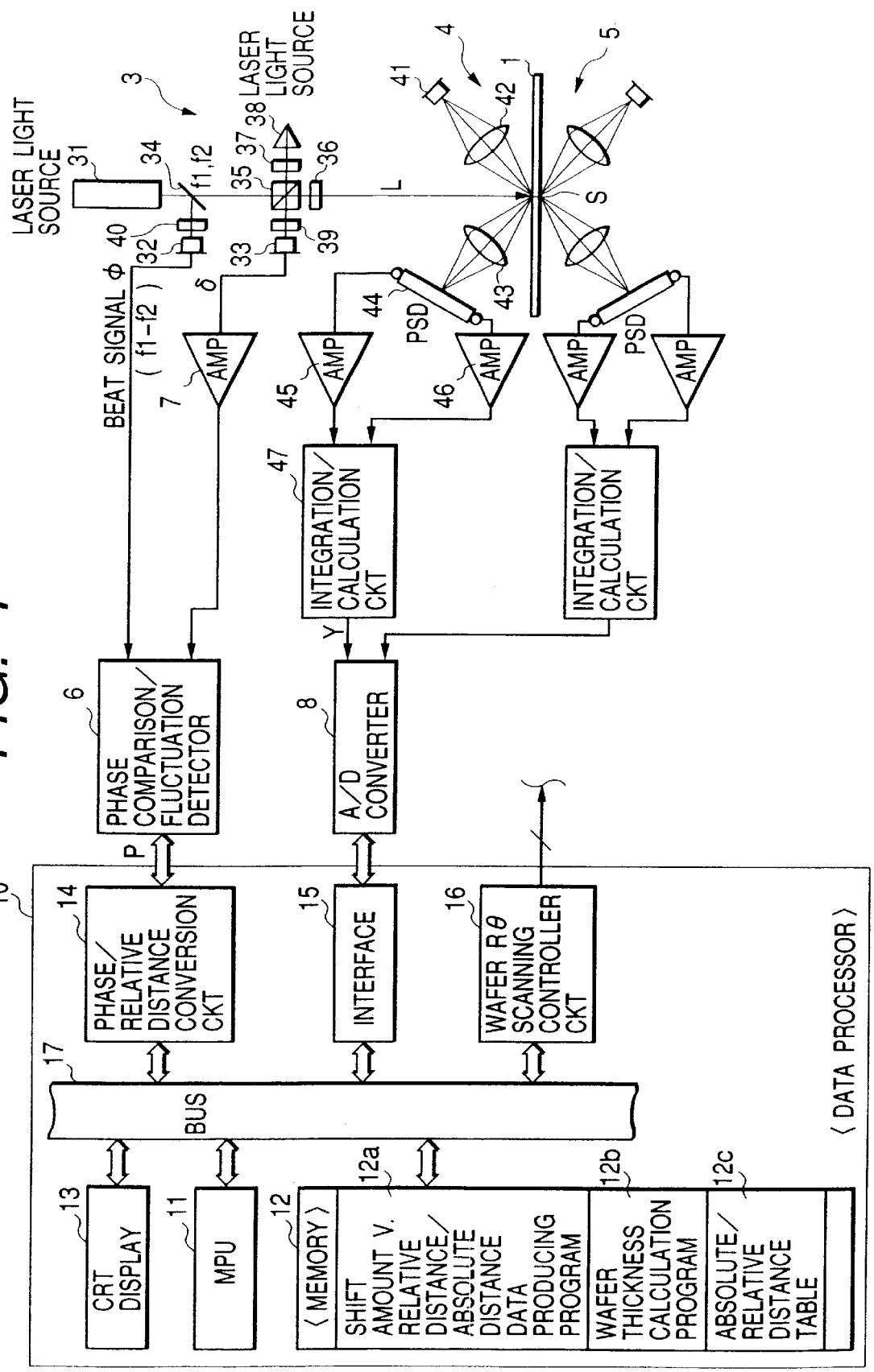
FIG. 1 shows the structure of an embodiment of a wafer measuring apparatus according to the present invention.

FIG. 1 shows the structure of an embodiment of a wafer thickness measuring apparatus according to the present invention; FIGS. 2(*a*) to (*c*) show views for explaining a wafer rotating table; FIG. 3 shows a flow chart of processes therefor; and FIG. 4 is a view for explanation of an absolute/relative distance conversion table therefor.

In the FIG. 1, a wafer 1 (including semiconductor wafers, magnetic head wafers, magnetic discs, etc.) is mounted on a rotating table 2 (see FIGS. 2(*a*) to (*c*)), and in an upper portion of the wafer 1 is provided a measurement equipment 3 of optical heterodyne interference for use in the flatness measurement of the wafer, wherein a laser beam L for measuring is irradiated upon it from the optical heterodyne interferometer measurement equipment 3, vertically.

Further, corresponding to the irradiation position (i.e., measurement point) S, on which the optical heterodyne interference measurement equipment 3 irradiates the measuring laser beam L, there is provided an absolute distance detector 4. The absolute distance detector 4 is one which generates the measuring laser beam in a direction inclined so as to receive a reflection light thereof, thereby detecting the absolute distance with use of a PSD, and is provided facing to the front surface side of the wafer 1, separately from the optical heterodyne interference measurement equipment 3 mentioned above. In the same manner, facing to the reverse surface side of the wafer 1, there is provided another absolute distance detector 5 which also irradiates at a position on the reverse side surface corresponding to the measurement point S so as to receive a reflection light thereof, thereby detecting the absolute distance with use of the PSD.

Those absolute distance detectors 4 and 5 are the same construction thereof, and the absolute distance detector 4 generates a detection value corresponding to the distance from a certain reference position facing to a front surface side of the wafer 1 up to the front surface of the wafer 1, while the absolute distance detector 5 generates a detection value corresponding to the distance from a certain reference position facing to a reverse surface side of the wafer 1 up to the reverse surface of the wafer 1. In this respect, those detectors measure the absolute distances with respect to the optical heterodyne interference measurement equipment 3. Further, the respective reference positions may be determined by fixing the absolute distance detectors 4 and 5 onto a frame of the apparatus, therefore there is no necessity that each of them must have a specific position. Those absolute distance detectors 4 and 5 are same in the construction thereof, therefore explanation will be given mainly on the absolute distance detector 4 in below, while omitting on the absolute distance detector 5.

The reason of measuring the absolute distances by means of those absolute distance detectors 4 and 5 with use of the PSD is for the purpose of obtaining an amount of relative fluctuation with respect to the wafer (including a wafer piece or chip 23) having a constant thickness being already known. Then, as will be explained later, the detection values of the absolute distance detectors 4 and 5 with use of the PSD will be used as detection voltage values of the PSD as they are, being corresponding to the numerical values of the respective measured distances thereof, here.

Figure 2A:
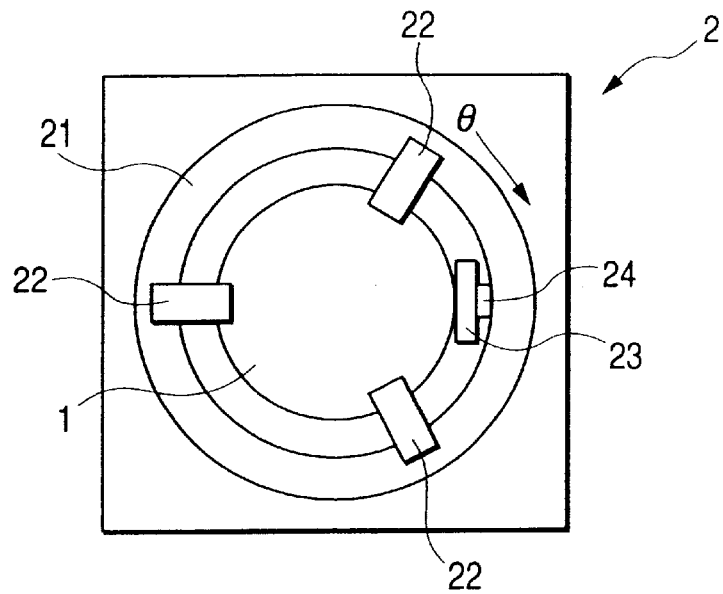
FIGS. 2(*a*), (*b*) and (*c*) show an plane view, a cross-section view at a position of a wafer chip, and a side view of the wafer chip of showing measuring condition thereof, for explanation of a wafer rotating table.
Figure 2B:
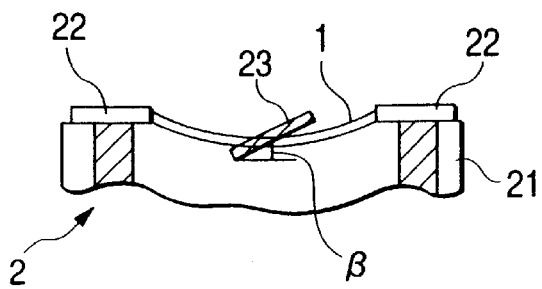
Figure 3:
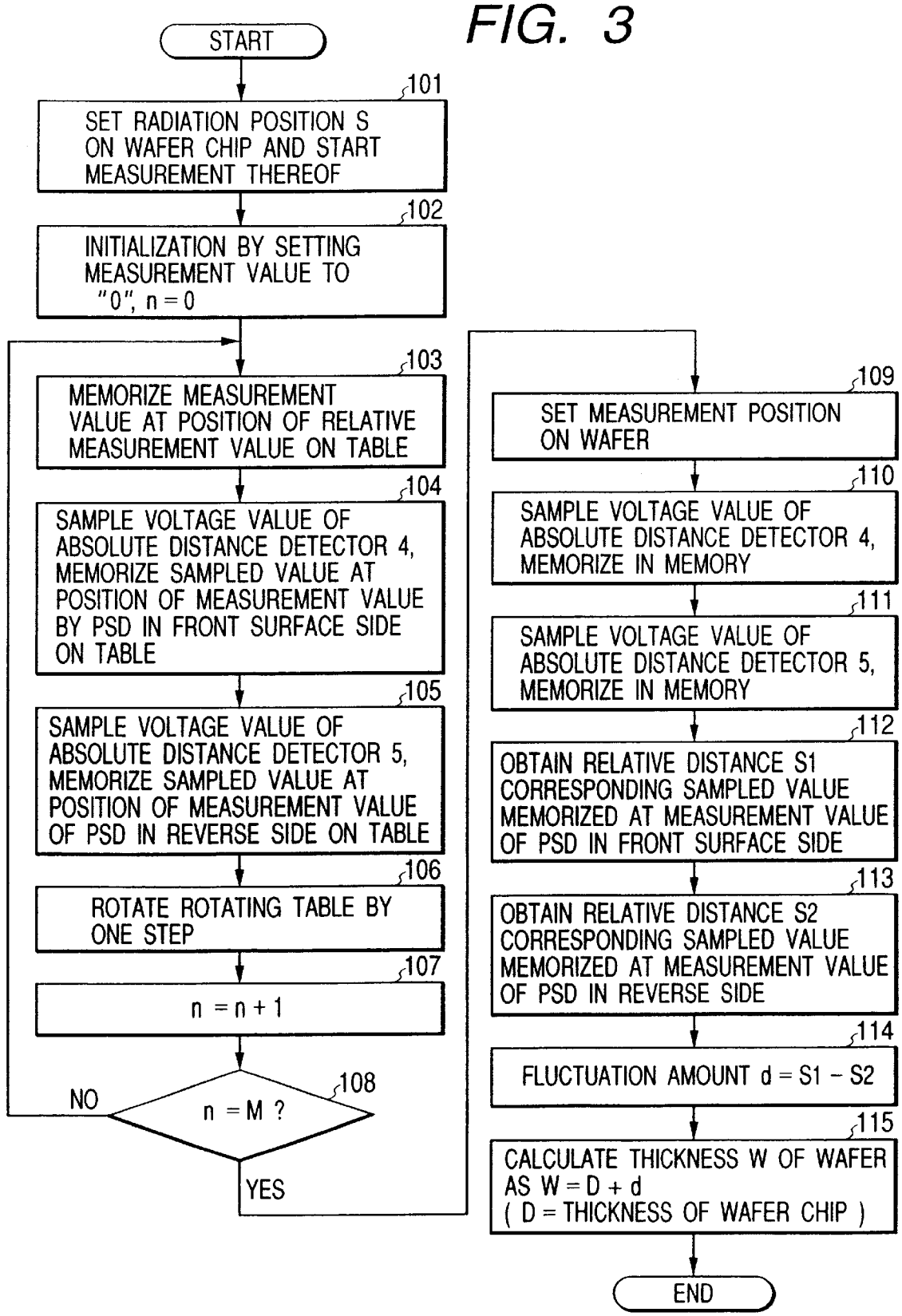
FIG. 3 shows a flow chart of process in the above.

The rotating table 2 is constructed with, as is shown in the plane view of the FIG. 2(a), a cylindrical plate-like spindle motor 21, being hollowed inside and by a one size bigger than the wafer 1 (see the FIG. 2(b)), three (3) wafer clamp mechanisms 22, 22 and 22, being supported on the periphery portion of the spindle motor 21 and provided at every distance of 120° in an inside thereof, and a strip-like wafer chip 23 which is positioned and fixed on the spindle motor 21 through a bracket 24 at the periphery thereof adjacent to the wafer 1. Further, the wafer 1 is positioned in the hollowed portion inside the cylinder of the spindle motor 21 by means of the clamp mechanisms 22, therefore it bends freely. However, the rotary drive mechanism of the spindle motor 21 is not illustrated.

In a relationship between the wafer 1 and the wafer chip 12 of thickness D already known, being positioned in the interior space of the cylinder, as is shown in the cross-section view at the position of the wafer chip 23 in the FIG. 2(b), the wafer 1 is clamped at the periphery portion thereof by means of the wafer clamp mechanisms 22, 22 and 22. With this, bent occurs in the wafer 1, falling down directing to the central portion thereof, therefore the wafer chip 23 is positioned at a height corresponding to the periphery portion of the wafer 1, with an inclination of β corresponding to the inclination in the periphery portion of the wafer 1. This inclination angle β is depicted in large in the figure, however this β is only a several degrees in the angle. According to the present invention, a fact that the wafer includes the wafer chip 23 which has a substantially constant thickness being already known in advance, for example D=775 μm in the thickness, is an important factor for calculation out of the thickness of the wafer.

Then in the FIG. 1, a reference numeral 10 indicates a processing apparatus for measured data, which has a MPU 11, a memory 12, a CRT display 13, a phase/difference converter circuit 14, an interface 15 and a controller circuit 16 for scanning the wafer at an angle Rθ (hereinafter, called by a wafer Rθ scanning controller circuit), and wherein these are connected to one another through a bus 17.

In the memory 12, there is provided a program 12a for producing data of movement amount v. relative distance/absolute distance, a program 12b for calculating the wafer thickness, and a table 12c for absolute/relative distance conversion, however there are also provided programs for performing a spiral scanning Rθ on the wafer and for display processing, though they are not especially shown here.

Here, the program 12a for producing data of movement amount v. relative distance/absolute distance, when it is executed by the MPU 11, brings the optical heterodyne interferometer 3 to irradiate the measuring beam L upon the wafer chip 23, thereby performing a θ scan on the wafer chip 23 along with a direction of rotation of the wafer 1, by means of the wafer Rθ scanning controller circuit 16, while being rotated. In this instance, corresponding to the detection values of the relative distances (i.e., the fluctuation amounts) of the wafer chip 23, which are obtained from the optical heterodyne interferometer 3, a process is also performed so that the detection values of absolute distances (i.e., detection voltage values) from the absolute distance detectors 4 and 5 using the PSD therewith are sampled at a large number of measurement points, depending upon a rotation positions θ of the wafer chip 23, and are written into the absolute/relative distance conversion table 12c.

The program 12b for calculating the wafer thickness is called up after the execution of the program 12a for producing data of movement amount v. relative distance/absolute distance, and when being executed by the MPU 11, it sets the laser irradiation position S at a predetermined measurement point on the wafer 1 and obtains the relative distances (i.e., the fluctuation amounts) by means of the optical heterodyne interferometer 3 from the detection values of absolute distances (i.e., detected voltage values) corresponding thereto, by referring to the absolute/relative distance conversion table 12c from the detection values of absolute distances of the absolute distance detectors 4 and 5. And, it calculates out a difference in the relative distance between the front surface side and the reverse surface side, so as to make the difference to be the fluctuation amount with respect to the thickness D=775 μm of the wafer chip 23. Namely, the thickness of the wafer 1 is calculated out by adding and/or subtracting the fluctuation amount to and/or from D=775 μm.

The optical heterodyne interferometer 3 has a laser light source 31 of dual wave-lengths, which generates a P polarization wave of frequency f1 and a S polarization wave of frequency f2, and two detectors 32 and 33, wherein the detector 32 is an optical sensor for detecting a phase φ of f1−f2 at a side of the reference light and the detector 33 an optical sensor for detecting a phase δ of f1−f2±Δf at a side of the measuring light.

A reference numeral 34 indicates a beam splitter (BS) of an angle of 135° (or 450° in the reverse direction) for dividing into a laser beam of the P polarization wave of frequency f1 and that of the S polarization wave of frequency f2. This BS 34 generates a reflection light of P polarization and a penetration light of P polarization upon the receipt of the laser beam of frequency f1, and inputs the reflection light of S polarization into the detector 32 through a polarizing plate 40 so as to detect it. Also, upon receipt of the laser beam of frequency f2, it generates a reflection light of S polarization and a penetration light of S polarization. The reflection light of frequency f2 is inputted into the detector 32 through the polarizing plate 40. As a result of this, in the detector 32 can be obtain a detection signal of phase $\phi$ in frequency (f1–f2) in the form of an electric signal at the reference side.

A reference numeral 35 indicates a polarizing beam splitter (PBS) of 45°, which receives the laser beam of frequency f1 as the measurement signal and the laser beam of frequency f2 from the laser beam penetrating through the BS 34. This PBS 35 passes the light of frequency f1 as it is so as to irradiate it through a $\lambda/4$ wave-length plate 36 upon an upper or front surface 1a of the wafer 1. This light comes to be the measurement light, and the reflection light of this reaches through the $\lambda/4$ wave-length plate 36 to the PBS 35, in which it is reflected in a direction of the detector 33 as the measurement signal to be incident upon the detector 33 through a polarizing plate 39. Also, the PBS 35 reflects the light of frequency f2 in the direction of a $\lambda/4$ wave-length plate 37 so as to reflect it on a reference mirror (corner cube) 38. And, upon receipt of this reflection light being returned, the polarizing plate 39 passes it therethrough to be inputted into the detector 33. As a result of this, in the detector 33 can be obtain a detection signal of phase $\delta=\phi\pm\Delta f$ in frequency (f1–f2) in the form of an electric signal at the measurement side. Here, $\pm\Delta f$ is a value which varies depending upon the fluctuation in vertical direction of the wafer 1.

The detection signal of the detector 32 is inputted as the reference signal into a phase comparison/fluctuation amount detector 6, while the detection signal of the detector 33 is amplified by an amplifier 7 to be inputted as the measurement signal into the phase comparison/fluctuation detector 6.

The phase comparison/fluctuation detector 6 generates a detection signal P of digital value, being indicative of the phase depending upon $\pm\Delta f$, so as to send it to the phase/distance converter circuit 14. The phase/distance converter circuit 14 generates an interruption signal by changing or converting the detection signal P into the distance data, and sends it onto the bus 17 to be delivered to the MPU 11.

The absolute distance detector 4 comprises a laser light source 41, for the optical heterodyne interferometer 3 to irradiate the laser beam upon the irradiation position S in a direction inclined, a focus lens 42 for focusing the measurement light L upon the focal point at the irradiation positions, a light receiving lens 43 being located at a position of the opposite side thereof, in symmetry to the focus lens 42 with respect to a normal line of the laser irradiation position S, amplifiers 45 and 46 for amplifying amplitude of currents which are generated at both ends of the PSD 44 which is located on a focal surface behind the light receiving lens, and an integration/calculation circuit 47, for integrating the output currents of the amplifiers 45 and 46 and then converting them into voltage value thereof so as to calculate out the current value of sum and/or difference between them, and further for calculating out a value obtained by dividing the difference of the current values with the sum of thereof.

Here, assuming that the both ends of the PSD 44 are (A) and (B), the length of it K, the light receiving position p, and the distance to the point p from the (A) end $y_p$, and further the voltage values obtained by integrating the output currents at the both ends (A) and (B) of the PSD are assumed to be Ia and Ib, respectively.

The distance $y_p$ can be obtained by the following calculating equation:

$$Y_p=[(Ia-Ib)/(Ia+Ib)]K$$

And, $Y_p$ this yp corresponds to the measurement value of the absolute distance.

The integration/calculation circuit 47 generates a calculation value Y of the absolute distance $y_p$, in a form of voltage value. This calculation value is converted into a digital value by means of an A/D converter (A/D) 8 to be inputted into the interface 15, thereby to be delivered to the MPU 11 as the voltage value detected. Also, to the interface 15 is inputted a similar voltage value from a side of the absolute distance detector 5.

Here, the voltage values, being indicative of the light receiving positions of the PSDs as the distances to be measured by the absolute distance detectors 4 and 5, are used as they are, but not converted into actual distances thereof. Of course, they may be converted into the actual distances, however they are sufficient to be converted into the stage of voltage, from the reasons mentioned previously.

With accompanying the FIG. 3, explanation will be given on calculation process of the wafer thickness in the measurement data processing device 10.

Upon input of a predetermined function key for the calculation process of the wafer thickness, the movement amount v. relative distance/absolute distance data producing program 12a is called up, and it brings the laser irradiation point S (i.e., measurement point) to be set on the wafer chip 23 so that the measurement beam of the optical heterodyne interferometer 3 is irradiated thereon, thereby starting the measurement of the wafer chip 23 (in step 101). Then, initializing by setting the measurement value of the optical heterodyne interferometer 3 to "0" so as to bring the irradiation position at present back be an original or starting point, i.e., n=0 (in step 102), the measurement value (at first to be "0") of the optical heterodyne interferometer 3 is stored as a sampling value into a column at the position of the scanning angle (at first, at the original point θ1) at present on a line of the relative measurement values, corresponding to the heterodyne measurement of the absolute/relative distance conversion table 12c shown in the FIG. 4 (in step 103). The voltage value of the absolute distance detector 4 is sampled, so as to be stored as the sampling value into the column of the of the scanning angle (at first, at the original point θ1) at present on a line of the PSD measurement values of the front surface side into the absolute/relative distance conversion table 12c (in step 104). The voltage value of the absolute distance detector 5 is sampled, so as to be stored as the sampling value into the column of the of the scanning angle (at first, at the original point θ1) at present on a line of the PSD measurement values of the reverse surface side in the absolute/relative distance conversion table 12c (in step 105). The rotating table 2 is rotated only by a one step (by an angle +α) in a direction of circumference thereof (in step 106) and a number n of times of measurements is incremented as n=n+1 (in step 107). And, it is decided whether the n exceeds a final potion M or not (in step 108). Here, if the measurement is not completed, the decision come to be "NO", and the process is turned back to the step 103. For example, if n=30, the number of data can be sampled so that correspondences can be made between the relative distances (fluctuations) and the absolute distances at the front surface side and the reverse surface side at the thirty (30) measurement points.

However, the measurement values (the fluctuations) of the optical heterodyne interferometer 3 indicate the relative distance in which the initialization value is turned to "0" in the step 101. In this respect, the measurement values (voltage values detected) of the PSD in the front surface side and the measurement values (voltage values detected) of the PSD in the reverse surface side indicate the absolute distances upon basis of a fixed point on the frame, respectively.

As a result of this, as shown in the FIG. 4, corresponding to the circumference angles θ1–θn, 0 μm, 5 μm, 10 μm . . . 150 μm can be obtained as the relative distances on the front surface side of wafer from the measure ment values of the optical heterodyne interferometer 3, respectively, and corresponding to those, the detected voltage values 2.0 V, 2.1 V . . . 5.0 V as the PSD measurement value in the front surface side, while the detected voltage value 4.8 V, 4.7 V . . . 1.8 V as the PSD measurement value in the reverse surface side, respectively. In this manner, the absolute/relative distance conversion table 12c is produced.

Figure 2C:
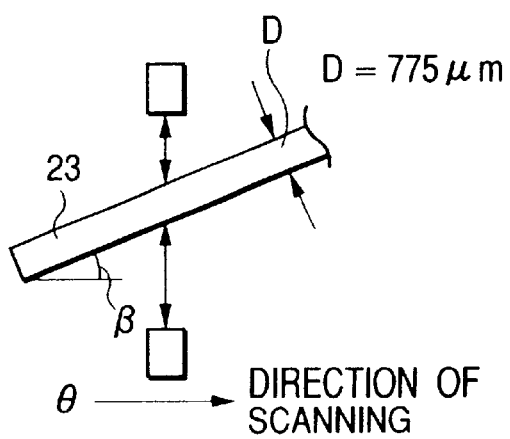

In this instance, it is assumed that the inclination of the wafer chip 23, as shown in the FIG. 2(c), is β in the angle tilting upward.

Further here, the reason that the measurement values of the of the optical heterodyne interferometer 3 are obtained only for the front surface side of thewafer chip 23, but not for the reverse side thereof, lies in that the wafer chip 23 has the constant thickness D=775 μm and has no bend in a shape of the stripe. Assuming no bend therein, the measurement values in the reverse side must have the relative values changing in the same manner but apart by D=775 μm therefrom. Therefore, there is no necessity of the measurement in the reverse side. However, if there is a necessity of increasing the accuracy more, the relative measurement values may be sampled by providing the optical heterodyne interferometer 3 in the reverse surface side too, corresponding to the measurement values of the PSD in the reverse surface side.

Completing the sampling of data at the n measurement points on the wafer chip 23, the decision in the step 108 comes to be "YES", and the MPU 11 calls up the wafer thickness calculating program 12b so as to execute it. Namely, it brings the laser irradiation position S on the periphery portion of the wafer 1, being located at the same height of the wafer chip 23 and having the inclination β corresponding thereto, and makes it the measurement point. With this, the measurement points of the absolute distance detectors 4 and 5 are set at the position lying within a range of height of the wafer chip 23 (in step 109). Here, the voltage values (the PSD measurement values of the front surface side) of the absolute distance detector 4 are sampled to be memorized into the memory (in step 110), and next, the voltage values (the PSD measurement values of the reverse surface side) of the absolute distance detector 5 is sampled to be memorized into the memory (in step 111).

By referring to the absolute/relative distance conversion table 12c, a relative distance S1 is obtained from the line of the relative measurement values corresponding to the sampled value in the PSD measurement value of the front surface side memorized in the step 110 (in step 112), and then, also by referring to the absolute/relative distance conversion table 12c, a relative distance S2 is obtained from the line of the relative measurement values corresponding to the sampled value in the PSD measurement value of the reverse surface side memorized in the step 111 (in step 113).

Here, it is assumed that, for example, the PSD measurement value of the front surface side, which is memorized in the step 112, is 2.1 V and the PSD measurement value of the reverse surface side, which is memorized in the step 113, is 4.5 V, then the relative distances S1 and S2, being obtained from the absolute/relative distance conversion table 12c, are S1=5 μm and S2=15 μm, respectively.

Next, a difference value d=S1–S2 is calculated out as the fluctuation amount between the front surface and the reverse surface with respect to the thickness (i.e., the reference value) of the wafer chip 23 (in step 114). In this instance, the difference value d is calculated to be 10 μm=15 μm–5 μm. Here, the reason that the measurement value on the front surface side of the wafer is subtracted from that of the reverse surface side lies in that, since the fluctuation of the thickness of that plate (i.e., wafer chip 23) comes into a relationship that it increases up on the front surface side while it decreases down on the reverse surface side when the absolute measurement is conducted on the thickness of the plate inclining or tilting upward between the front surface and the reverse surface thereof (see the FIG. 2(c)), then it appears in a form the difference therebetween. Namely, the relative distance in the front surface side increases up greatly when the sample is inclined upward, then the thickness of the wafer comes to be thicker if the increase in the relative distances on the reverse surface side is smaller than that, while the thickness of the wafer comes to be thinner when the relative distance on the front surface side increases in small and if the increases in the relative distances on both the front surface side and the reverse surface side is greater than that. When the sample is inclined downward, the calculation equation mentioned in the above come to be reversed thereto.

And, lastly, a wafer thickness is calculated to be D+d upon the basis of the thickness D of the wafer chop 23 (in step 115). Namely, it comes to be D=775 μm+10 μm, the thickness of the wafer 1 is calculated to be 785 μm, in the example mentioned in the above.

of course, in a case where the measurement value S2 on the reverse surface side is larger than the measurement value S1 on the front surface side, the value d calculated by S1–S2 is negative, then the wafer thickness is calculated to be smaller than 775 μm.

By the way, in the measurement of the wafer thickness mentioned in the above, the absolute/relative distance conversion table 12c is produced every time when the measurement of the wafer thickness is performed, according to the data of the relative measurement, therefore the measurement of the wafer thickness is not affected by the contemporary change of temperature.

Though being explained in the above, in the present embodiment, the above-mentioned wafer chip is a piece of the wafer, however it should not be restricted only to such the piece of the wafer, but it may be a general sample piece, being equivalent to the wafer in the thickness thereof, such as, a magnetic head wafer for structuring a magnetic head element, and various magnetic discs, etc., other than the semiconductor wafer mentioned above.

Also, the measurement value by means of the optical heterodyne interferometer is the relative value and is obtained by subtracting the measurement value on the reverse surface side of the wafer from the measurement value on the front surface side thereof, therefore the initial value must not necessarily be set to "0". This optical heterodyne interferometer makes the measurement on the front surface side of the wafer, in the present embodiment, however it is of course that the optical heterodyne interferometer can be provided in the reverse surface side of the wafer. Also, in a case where the optical heterodyne interferometers are provided in both sides, the front surface and the reverse surface sides, the relative value S1 obtained from the line of the relative measurement values corresponding to the sampled value memorized in the step 110, in the step 112 of the process shown in the FIG. 3, comes to be the measurement value by means of the optical heterodyne interferometer in the front surface side, while the relative value S2 obtained from the line of the relative measurement values corresponding to the sampled value memorized in the step 111, in the step 113 of the process shown in the FIG. 3, comes to be the measurement by means of the optical heterodyne interferometer in the reverse surface side.

As is fully explained in the above, according to the present invention, the detection values are obtained from the sample piece (for example, a wafer chip) at a plurality of measurement points thereon by the first and second detectors for absolute measurement of distances, and at the same time, the measurement values of the fluctuations, for relative measurement of distances, are obtained by the optical heterodyne interferometer, and those measurement values are memorized as a plurality of measurement data being related with those measurement values. When measuring the thickness of the wafer, the measurements are performed at the measurement points on the wafer which has the front surface and the reverse surface in height, lying within the height of the sample piece, on which such the correspondence is obtained, thereby obtaining the detection values of the first and second detectors. Searching conversely from those detection values by referring the correspondence data, the respective detection values are converted into the data of the relative fluctuations therefrom upon the basis of the thickness of the sample piece, thereby obtaining the relative amounts of shifting in positions (i.e., the distances) upon the basis of the thickness of the sample piece, respectively. Then, by conducting addition and/or subtraction of the shifting amount on the front surface and the reverse surface from the thickness of the sample piece as a reference, it is possible to calculate the thickness of the wafer to be measured.

The value being actually calculated in this case is a sum of the relative measurement value and the known thickness of the sample piece, therefore the absolute values obtained as the detection values of the first and second detectors only function as a medium for obtaining the relative measurement values. As a result of this, at the time point when measuring the wafer thickness, the corresponding data are produced by the data sampling/memorizing means, therefore the accurate wafer thickness can be obtained by the relative measurement at every moment, without receiving ill influence of the temperature, and without the necessity of an apparatus for the absolute measurement with high accuracy.

What is claimed is:

1. A wafer thickness measuring apparatus with use of an optical heterodyne interferometer, comprising:

a sample piece being positioned corresponding to height of a wafer and inclined at a predetermined angle substantially corresponding to an inclination angle due to bend of said wafer, and having a constant thickness being already known and equivalent to that of said wafer;

a first detector for generating a detection signal depending upon a distance from a predetermined reference position facing to a front surface side of said wafer to a position on the front surface of said wafer corresponding to a measurement point of said optical heterodyne interferometer;

a second detector for generating a detection signal depending upon a distance from a predetermined reference position facing to a reverse surface side of said wafer to a position on the reverse surface of said wafer corresponding to a measurement point of said optical heterodyne interferometer;

a data sampling/memorizing means for measuring fluctuations at a large number of measurement points on the front surface or the reverse surface of said sample piece by means of said optical heterodyne interferometer, and then for memorizing detection values based upon said detection signals of said first and second detectors, which are obtained at said measurement points, depending upon the fluctuation amounts at the respective measurement points; and means for obtaining the respective detection values upon the detection signals of said first and second detectors at arbitrary measurement points on said wafer, a front surface and a reverse surface of which lie within a range of height between the front surface and the reverse surface of said sample piece, and for obtaining said fluctuation amounts corresponding to said detection values which are measured by said optical heterodyne interferometer and memorized in said data sampling/memorizing means from the respective detection values, respectively, thereby calculating out thickness of said wafer upon basis of the respective fluctuation amounts obtained and the thickness of said sample piece.

2. A wafer thickness measuring apparatus as defined in the claim 1, further comprising a wafer thickness calculation means for obtaining the detection values upon said detection signals of said first and second detectors at the measurement points on said wafer, having the inclination corresponding to said sample piece and lying within the range of height between the front surface and the reverse surface of said sample piece, for obtaining the measurement values of said fluctuation amounts corresponding to said detection values of said first and second detectors, being memorized in said data sampling/memorizing means, respectively, thereby calculating out thickness of said wafer upon basis of the respective fluctuation amounts obtained and the thickness of said sample piece.

3. A wafer thickness measuring apparatus as defined in the claim 2, further comprising a processor and a memory, wherein said wafer is mounted on a rotating table under condition of being bent by it's own weight, said sample piece is mounted and fixed onto an outside of said wafer on said rotating table, a portion or all of functions of said data sampling/memorizing means and said wafer thickness calculation means is achieved by execution of a predetermined program by means of said processor, said data sampling/memorizing means obtains the detection values being obtainable from the detection signals of said first and second detectors and the measurement values of said fluctuation amount corresponding to said measurement points obtained by rotating said rotating table by a predetermined angle, so as to produces a correspondence table of said detection values and said measurement values, and said wafer thickness calculation means calculates the fluctuation amounts in the thickness with respect to the thickness of said sample piece by referring to said correspondence table, so as to calculate out the thickness of said wafer from said calculated value and the thickness of said sample piece.

4. A wafer thickness measuring apparatus for detecting a thickness of a wafer to be measured, as well as a flatness on a surface thereof, comprising:

an absolute distance detecting means for detecting an absolute distance from a reference position facing a front surface side of said wafer to the front surface of said wafer;

a relative fluctuation detecting means for detecting a relative fluctuation upon the front surface of said wafer;

means for memorizing a plurality of detected values from said absolute distance measuring means and a plurality of detected values from said relative fluctuation detecting means, by making correspondence therebetween; and a data processing means for calculating the thickness of said wafer, upon basis of the detected values from said absolute distance detecting means and said relative fluctuation detecting means, and the memorized values thereof in said memorizing means, wherein said apparatus further comprises a sample piece being positioned and inclined at a predetermined angle corresponding to an inclination angle due to bend caused in a portion of said wafer when being mounted on said apparatus, wherein said data processing means memorizes the detected values from said absolute distance detecting means and said relative fluctuation detecting means at a plurality of measurement points upon the surface of said sample piece by making correspondence therebetween, and when calculating the thickness of said wafer, said data processing means obtains the relative fluctuation value corresponding to the measurement point upon basis of the detected value of said absolute distance detecting means, thereby to calculate the thickness of said wafer upon basis of comparison between the detected value of said relative fluctuation detecting means and the obtained value of the relative fluctuation.

5. A wafer thickness measuring apparatus as defined in the claim 4, further comprising a second absolute distance measuring means facing a reverse surface side of said wafer.

6. A wafer thickness measuring apparatus as defined in the claim 4, wherein said memorizing means further memorizes detected values of said second absolute distance detecting means therein, by making correspondence to the plurality of the detected values of said relative fluctuation detecting means.

7. A wafer thickness measuring apparatus as defined in the claim 4, wherein said sample piece is a strip-like wafer chip.

8. A wafer thickness measuring apparatus as defined in the claim 4, further comprising a clamp mechanism for mounting said wafer to be measured in a disc-like shape, and said sample piece is positioned, by means of a bracket being provided separately from said clamp mechanism, being inclined at the predetermined angle corresponding to said inclination angle and neighboring said wafer.

9. A wafer thickness measuring apparatus as defined in the claim 4, wherein said memorizing means comprises a table in which the plural detected values of said absolute distance detecting means and the detected values of said relative fluctuation detecting means are memorized therein by making correspondence therebetween.

10. A wafer thickness measuring apparatus as defined in the claim 4, wherein said absolute distance detecting means comprises a laser light source, a PSD for detecting a reflection laser light being reflected upon the surface of said wafer, and an integrating means for integrating an output from said PSD.

11. A wafer thickness measuring apparatus as defined in the claim 4, wherein said relative fluctuation detecting means comprises an optical heterodyne interferometer.

12. A wafer thickness measuring apparatus as defined in the claim 4, wherein the values of said absolute distance detecting means and said relative fluctuation detecting means, being memorized in said memorizing means by making correspondence therebetween, are detected at the detection points of about thirty (30) in number thereof.

13. A wafer thickness measuring apparatus as defined in the claim 4, wherein detection is conducted by removing said absolute distance detecting means and said relative fluctuation detecting means in a direction of periphery of said wafer.

14. A wafer thickness measuring method for detecting a thickness of a wafer to be measured, comprising the following steps:

detecting a sample piece being positioned and inclined at a predetermined angle corresponding to an inclination angle due to bend caused in a portion of said wafer to be measured when being mounted on said apparatus, in advance, on an absolute distance from a reference position facing a front surface side of said sample piece to the front surface thereof and an fluctuation upon the surface of said sample piece;

memorizing the detected distance value and the relative fluctuation by making correspondence therebetween;

detecting the absolute distance from said reference position facing a front surface side to the front surface of said wafer to be measured, which is mounted on a measuring apparatus, and the relative fluctuation upon the surface of said wafer; and picking up the relative fluctuation memorized in advance, by making correspondence with the detected absolute distance, and compare the relative fluctuation picked up with the relative fluctuation detected, thereby to calculate the thickness of said wafer.

15. A wafer thickness measuring method as defined in the claim 14, further comprising a step of detecting the absolute distances and the relative fluctuations on a reverse surface sides of said wafer and said sample piece, so as to calculate the thickness of said wafer.

16. A wafer thickness measuring method as defined in the claim 14, wherein detection on the relative fluctuation is conducted by an optical heterodyne interferometer.

17. A wafer thickness measuring method as defined in the claim 14, wherein detection of the absolute distance and the relative fluctuation which are detected in advance is conducted at the detection points of about thirty (30) in number thereof.

18. A wafer thickness measuring method as defined in the claim 14, wherein the detection of the absolute distance and the relative fluctuation is conducted by removing in a direction of periphery of said wafer.

* * * * *